US006199379B1

(12) United States Patent
Hung

(10) Patent No.: US 6,199,379 B1
(45) Date of Patent: Mar. 13, 2001

(54) OIL CIRCUIT OF A JACK FOR RISING OBJECT TO PRESET POSITION RAPIDLY

(75) Inventor: Michael Hung, Tao Yuan (TW)

(73) Assignee: MVP (H.K.) Industries Limited, North Point (HK)

( * ) Notice: Subject to any disclaimer, the term of this patent is extended or adjusted under 35 U.S.C. 154(b) by 0 days.

(21) Appl. No.: 09/414,562

(22) Filed: Oct. 8, 1999

(51) Int. Cl.[7] .................................................. F16D 31/02
(52) U.S. Cl. ................................ 60/479; 60/481; 60/482
(58) Field of Search ................................ 60/477, 481, 482

(56) References Cited

U.S. PATENT DOCUMENTS 5,755,099 * 5/1998 Hung ...................................... 60/479

* cited by examiner

*Primary Examiner*—Edward K. Look
*Assistant Examiner*—Michael Leslie
(74) *Attorney, Agent, or Firm*—Bacon & Thomas, PLLC

(57) ABSTRACT

An oil circuit of a jack for rising an object to a preset position rapidly, wherein the oil inlet circuit of a hydraulic loop system is improved. An oil channel is installed between the inner oil chamber of the piston rod and the sequential valve. A check valve is installed between the oil channel and the sequential valve. An oil channel is installed between the sequential valve and the check valve for being connected to the inner oil chamber of the piston rod. By changing the positions of the check valve and the oil channel. When in the working conditions of dump load or light load, the sequential valve is closed, thus, the hydraulic oil may enter into the inner oil chamber of the piston rod from the pumping oil chamber through the check valve so that the piston rod will rise rapidly to a still condition. In the still condition, since the check valve closes the oil channel, the sequential valve will open automatically so that the inner oil chamber of the piston rod is communicated to the inner oil reservoir. Thus the inner and outer oil pressures of the oil guiding tube in the piston rod are equal. Thus, no strong still load hydraulic pressure exists in the oil guiding tube within the inner oil chamber of the piston rod. BY this changing, the still load hydraulic pressure of the inner oil reservoir and the inner oil chamber of the piston rod can be adjusted equilibrium by the sequential valve. Therefore, the problem of breakage of the oil guiding tube of the piston rod and the high cost due to confinement in material are solved. Moreover, the sequential valve can be located outsides so that the sequential valve is adjustable at outside to a preset actuating pressure.

2 Claims, 7 Drawing Sheets

OIL CIRCUIT OF A JACK FOR RISING OBJECT TO PRESET POSITION RAPIDLY

FIELD OF THE INVENTION

The present invention relates to an oil circuit of a jack for rising an object to a preset position rapidly, which improve the device disclosed in U.S. Pat. No. 5,755,099 so that the piston rod can attain a still state rapidly. The inner oil chamber of the piston rod is communicated to inner oil reservoir so that the inner and outer oil pressure of the oil tube are equal so that breakage is prevented.

BACKGROUND OF THE INVENTION

In using a conventional hydraulic jack, despite of dummy load or loading condition, the handle must move repeated many times so as to drive the oil cylinder to work. However, since in dummy load or light load, it still needs to be driven repeated, much work is wasted. Therefore, the invention in U.S. Pat. No. 5,755,099, "Hydraulic Circuit System for One Touch Jack and Its Structure", discloses a jack structure, in which the jack hydraulic loop circuit includes an oil inlet circuit, an oil return circuit and an overload protecting circuit.

In the oil inlet circuit, the outer oil reservoir is communicated to the pumping oil chamber through a check valve. The pumping oil chamber is communicated to a oil guiding tube through another check valve, The oil guiding tube is embedded into the inner oil chamber in the piston rod for forming as a loop. The pumping oil chamber is communicated to the inner oil reservoir of the piston rod through a sequential valve B. The outer oil reservoir is communicated to the inner oil reservoir of the hydraulic cylinder through a check valve. When a manual pump is in dummy load or light load, the oil circuit provides hydraulic oil to the inner oil chamber of the piston rod from the pump and through the oil guiding tube.

In the oil return circuit, the inner oil reservoir is communicated to the inner oil chamber of the piston rod through a check valve, then it further passes through a release valve to be communicated to the outer oil reservoir. When oil is unloaded and then it desires to the original position, the release valve can be adjusted to a release position so that the oil return circuit is conducted.

In the overload circuit, an outer oil reservoir passes through a safety valve to be communicated to the oil chamber of a manual pump. When the pressure of the hydraulic cylinder is over a rated pressure, the safety valve will be conducted so that the overload protecting circuit will open automatically. In the aforesaid hydraulic loop system, the maximum effective oil storing amount of the pumping oil chamber of the manual pump is large than or equal to the maximum effective oil storing amount of the inner oil chamber in the piston rod so that the hydraulic jack may rapidly rise to a loading position in dummy or light load condition.

However, in above invention, for the check valves in the oil circuit and the oil channels, since when the piston rod move to a position in one touch, the oil guiding tube and the inner oil reservoir are in still condition. Thus, the inner and outer pressures of the oil guiding tube in the piston rod are unequal, the oil guiding tube must suffer from a large still load pressure. Therefore, the pressure-resistance of the oil guiding tube must be further improved, but this will increase the cost. If the pressure-resistance of the oil guiding tube is insufficient, it is possible to break out. Therefore, many considerations in safety are concerned for the prior art design.

SUMMARY OF THE INVENTION

Accordingly, the primary object of the present invention is to provide an oil circuit of a jack for rising an object to a preset position rapidly, wherein the oil inlet circuit of a hydraulic loop system is improved. An oil channel is installed between the inner oil chamber of the piston rod and the sequential valve. A check valve is installed between the oil channel and the sequential valve. An oil channel is installed between the sequential valve and the check valve for being connected to the inner oil chamber of the piston rod. By changing the positions of the check valve and the oil channel. When in the working conditions of dump load or light load, the sequential valve is closed, thus, the hydraulic oil may enter into the inner oil chamber of the piston rod from the pumping oil chamber through the check valve so that the piston rod will rise rapidly to a still condition. In the still condition, since the check valve closes the oil channel, the sequential valve will open automatically so that the inner oil chamber of the piston rod is communicated to the inner oil reservoir. Thus the inner and outer oil pressures of the oil guiding tube in the piston rod are equal. Thus, no strong still load hydraulic pressure exists in the oil guiding tube within the inner oil chamber of the piston rod. BY this changing, the still load hydraulic pressure of the inner oil reservoir and the inner oil chamber of the piston rod can be adjusted equilibrium by the sequential valve. Therefore, the problem of breakage of the oil guiding tube of the piston rod and the high cost due to confinement in material are solved. Moreover, the sequential valve can be located outsides so that the sequential valve is adjustable outsides to a preset actuating pressure.

Another object of the present invention is to provide an oil circuit of a jack for rising an object to a preset position rapidly, wherein the sequential valve is located outsides with a 90 degrees of position shift, and a connecting oil channel is installed between a ball vale and the inner oil reservoir so that the adjusting nut of the sequential valve is locked to the outer wall of the rear seat of a jack. The sequential valve B can be located outsides so that the sequential valve is adjustable outsides to a preset actuating pressure.

The various objects and advantages of the present invention will be more readily understood from the following detailed description when read in conjunction with the appended drawing.

DETAILED DESCRIPTION OF THE PREFERRED EMBODIMENTS

Figure 1:
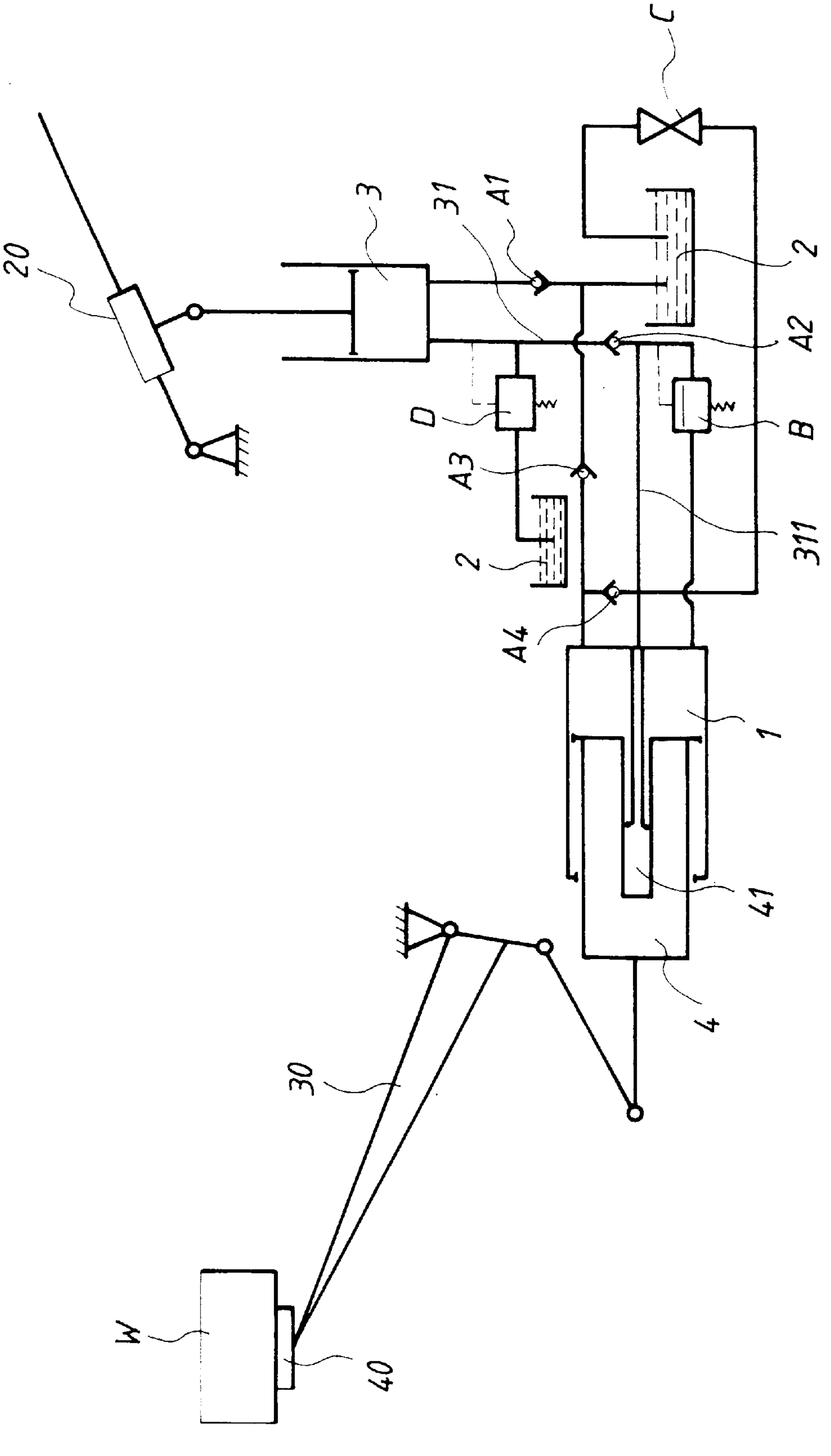
FIG. 1 illustrates a hydraulic circuit system according to the present invention.
Figure 2:
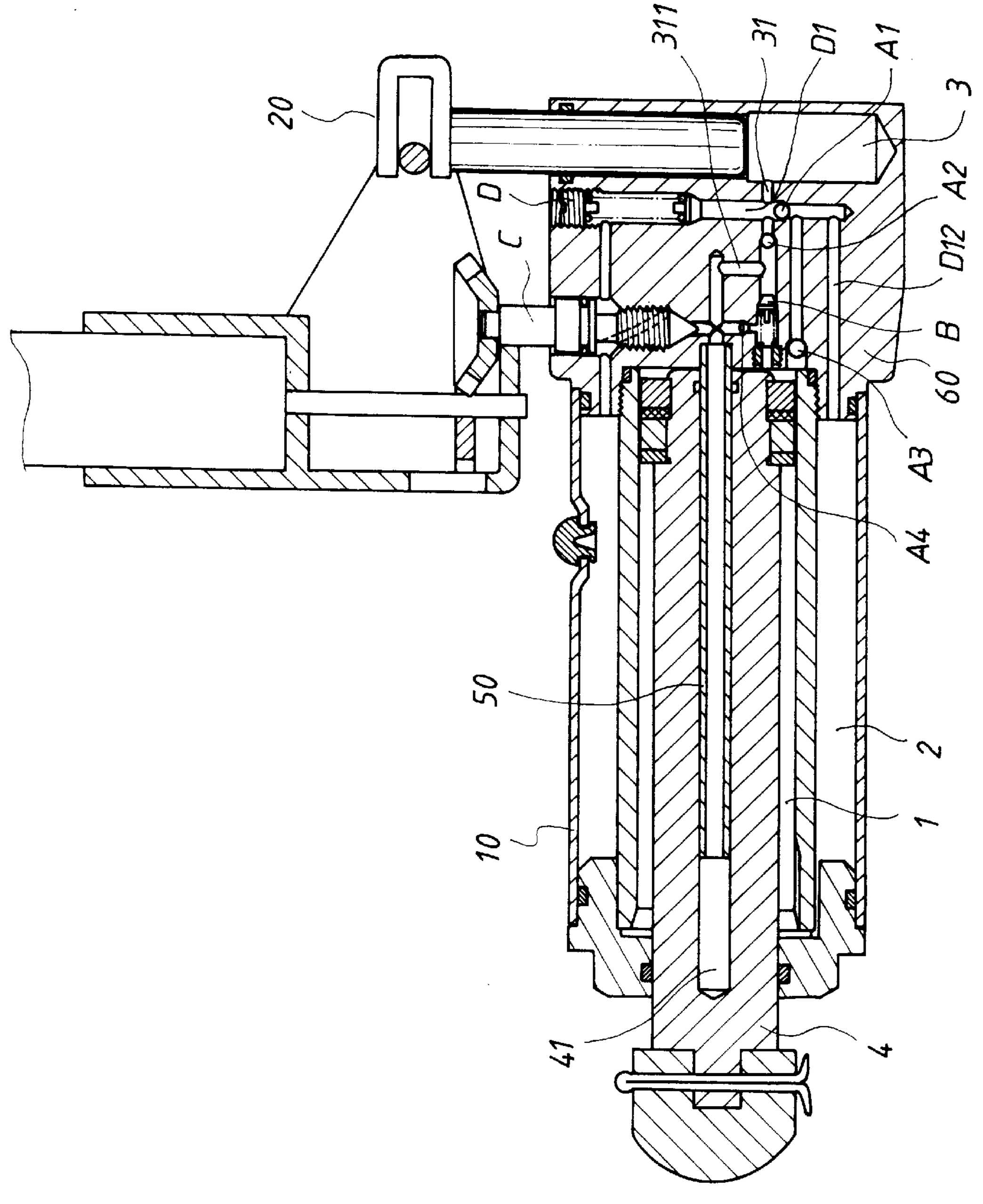
FIG. 2 is a cross sectional view of the structure of a jack according to the present invention.

With reference to FIGS. 1 and 2, the oil circuit of a jack for rising an object to a preset position rapidly of the present invention include an oil inlet circuit, an oil return circuit and an overload protecting circuit, and the inner oil reservoir 1, the outer oil reservoir 2, the pumping oil chamber 3 and piston rod 4 of a hydraulic cylinder 10.

Figure 3:
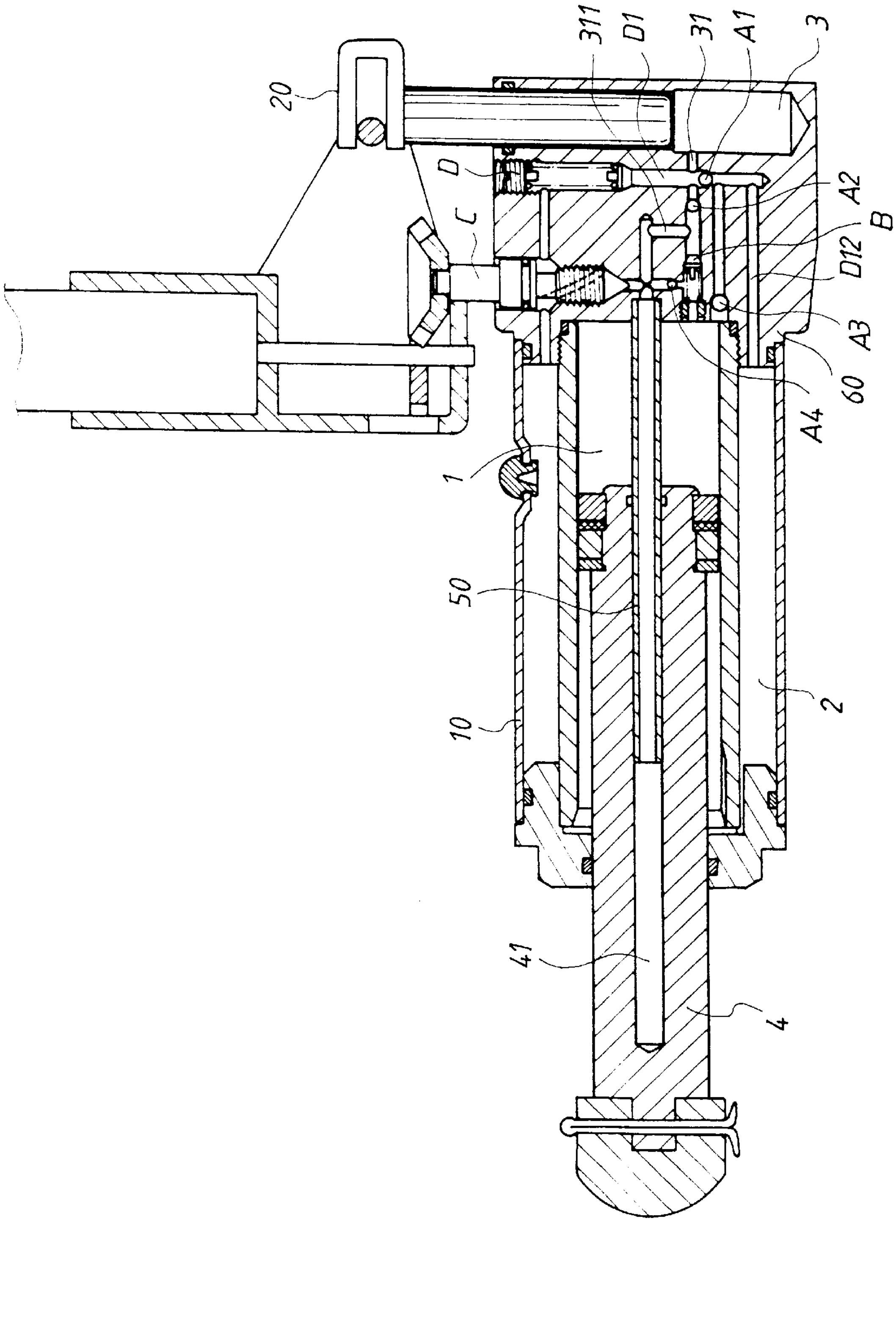
FIG. 3 illustrates displacement of the piston rod to its loading position in one step.

The oil inlet circuit is formed by the outer oil reservoir 2 of the hydraulic cylinder 10 being connected to the pumping oil chamber 3 through a check valve A1. The pumping oil chamber 3 is connected to the inner oil reservoir 1 of the hydraulic cylinder 10 through a sequential valve B. The outer oil reservoir 2 is connected to the inner oil reservoir 1 of the hydraulic cylinder 10 through a check valve 3. An oil channel 31 is installed between the inner oil chamber 41 of the piston rod 4 and the sequential valve B. A check valve A2 is installed between the oil channel 31 and the sequential valve B. A oil channel 311 is installed between the sequential valve B and the check valve A2 for being connected to the inner oil chamber 41 of the piston rod 41. By changing the positions of the check valve A2 and the oil channel 31 and 311. When in the working conditions of dump load or light load, the sequential valve B is closed, thus, the hydraulic oil may enter into the inner oil chamber 41 of the piston rod 4 from the pumping oil chamber 3 through the check valve A2 so that the piston rod 4 will rise rapidly to a still condition (as shown in FIG. 3). In the still load condition, since the check valve A2 closes the oil channel 31, the sequential valve B will open automatically so that the inner oil chamber 41 of the piston rod 4 is communicated to the inner oil reservoir 1. Thus the inner and outer oil pressures of the oil guiding tube 50 in the piston rod 4 are equal. Thus, no strong still load hydraulic pressure does not exist in the oil guiding tube 50 within the inner oil chamber 41 of the piston rod 4. BY this change, the still load hydraulic pressures of the inner oil reservoir 1 and the inner oil chamber 41 of the piston rod 4 can be adjusted equilibrium by the sequential valve B. Therefore, the problem of breakage of the oil guiding tube 50 of the piston rod 4 and the high cost due to confinement in material are solved.

In the oil return circuit, the inner oil reservoir 1 of the hydraulic cylinder 10 is connected to the inner oil chamber 41 of the piston rod 4 through a check valve 4, then it further passes through a release valve C to the outer oil reservoir 2. After unloading so as to be returned to the original position, the release valve C can be adjusted to a releasing condition, so that the oil return circuit is conducted.

In the overloading protecting circuit, the outer oil reservoir 2 of the hydraulic cylinder 10 passes through a safety valve D to be connected to the pumping oil chamber 3. When the pressure of the hydraulic cylinder 10 is over a rated pressure, the safety valve will be conducted so that the overload protecting circuit will open automatically.

In the aforesaid hydraulic loop system, the maximum effective oil storing amount of the pumping oil chamber 3 is larger than or equal to the maximum effective oil storing amount of the inner oil chamber 41 in the piston rod so that the hydraulic jack may rapidly rise to a loading position in dummy or light load condition.

Figure 4:
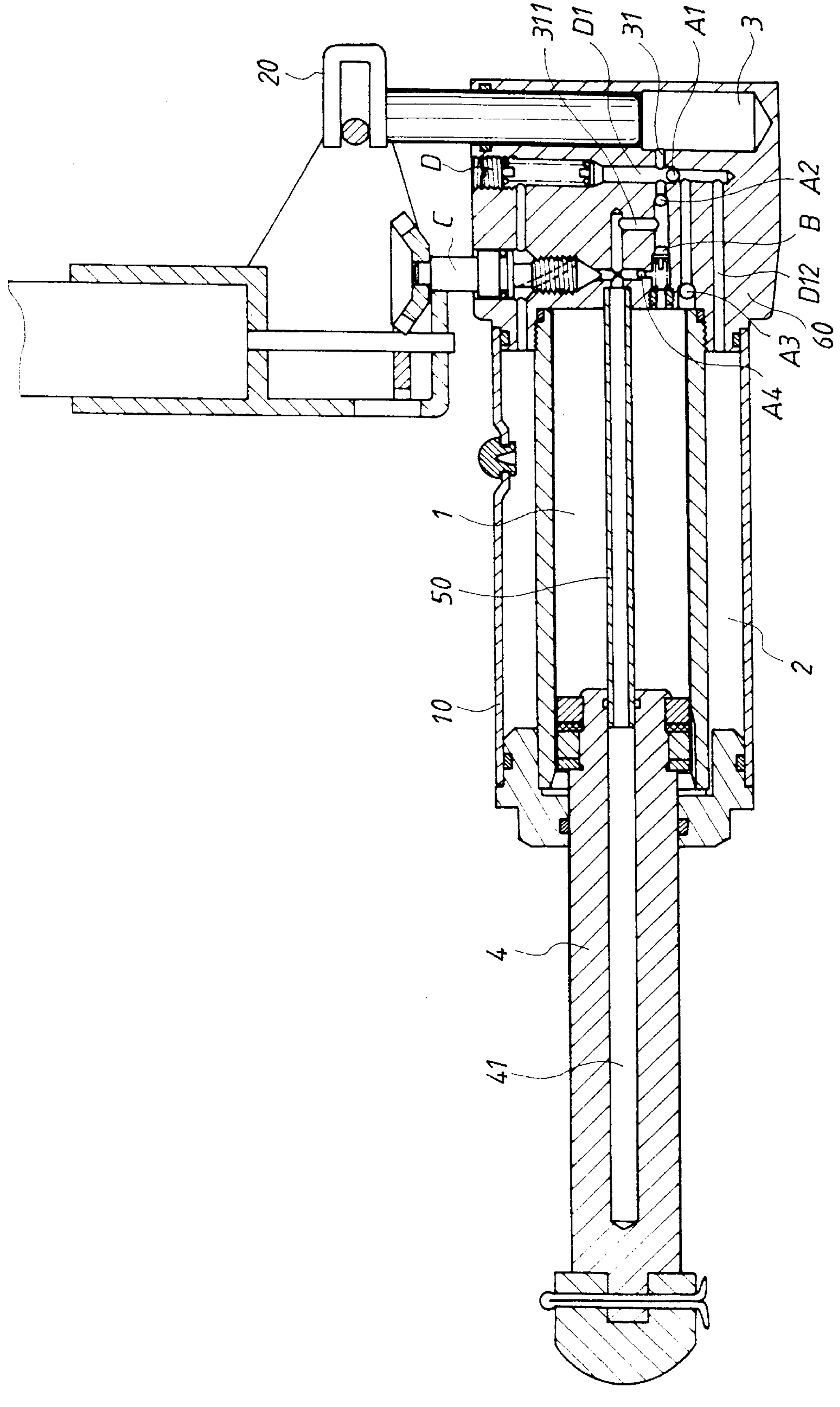
FIG. 4 illustrates further raising of the piston rod to support a load.

In the aforesaid operation, when the piston rod 4 moves forwards, since the pressure of the inner oil reservoir 1 of the hydraulic cylinder 10 reduces abruptly, the hydraulic oil will automatically enter into the inner oil reservoir 1 from the outer oil reservoir 2 through an oil channel D12. Moreover, some hydraulic oil may flow to the pumping oil chamber 3 along the oil channel D1 for waiting that the pump 21 process a hydraulic circulate work. Now, the hydraulic oil can not enter into the inner oil chamber 41 of a saturated piston rod 4. Therefore, a pressure sufficient to actuate the sequential valve B is attained, thus, the hydraulic oil will enter into the inner oil reservoir 4 from the oil channel 31 of the pumping oil chamber 3 through the sequential valve B so that the piston rod 4 ejects a heavy object W to be raised slowly in a lower speed to a preset ejecting position or to a whole rising state (as shown in FIG. 4). The pressure of the sequential valve B may be set in the preset value for actuating.

Figure 5:
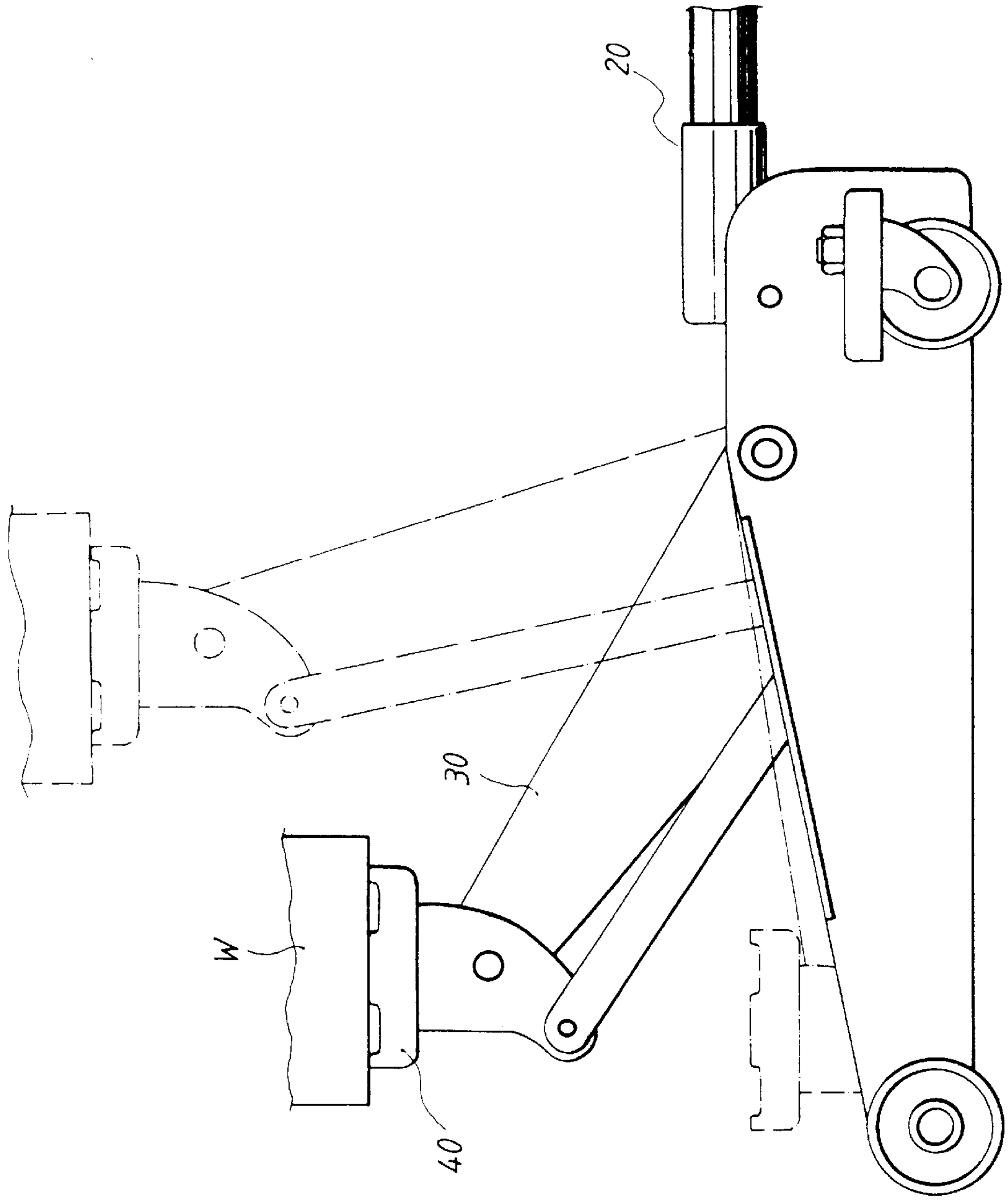
FIG. 5 illustrates displacement of raising arm and support plate by action of piston rod from a standstill position to a full raising position.

As shown in FIG. 5, the arm 30 of the jack and the top disk 40 are raised quickly to a preset position to contact with a heavy object W from a still load condition along with the displacement of the piston rod 4 so as to rise the object W.

Figure 6:
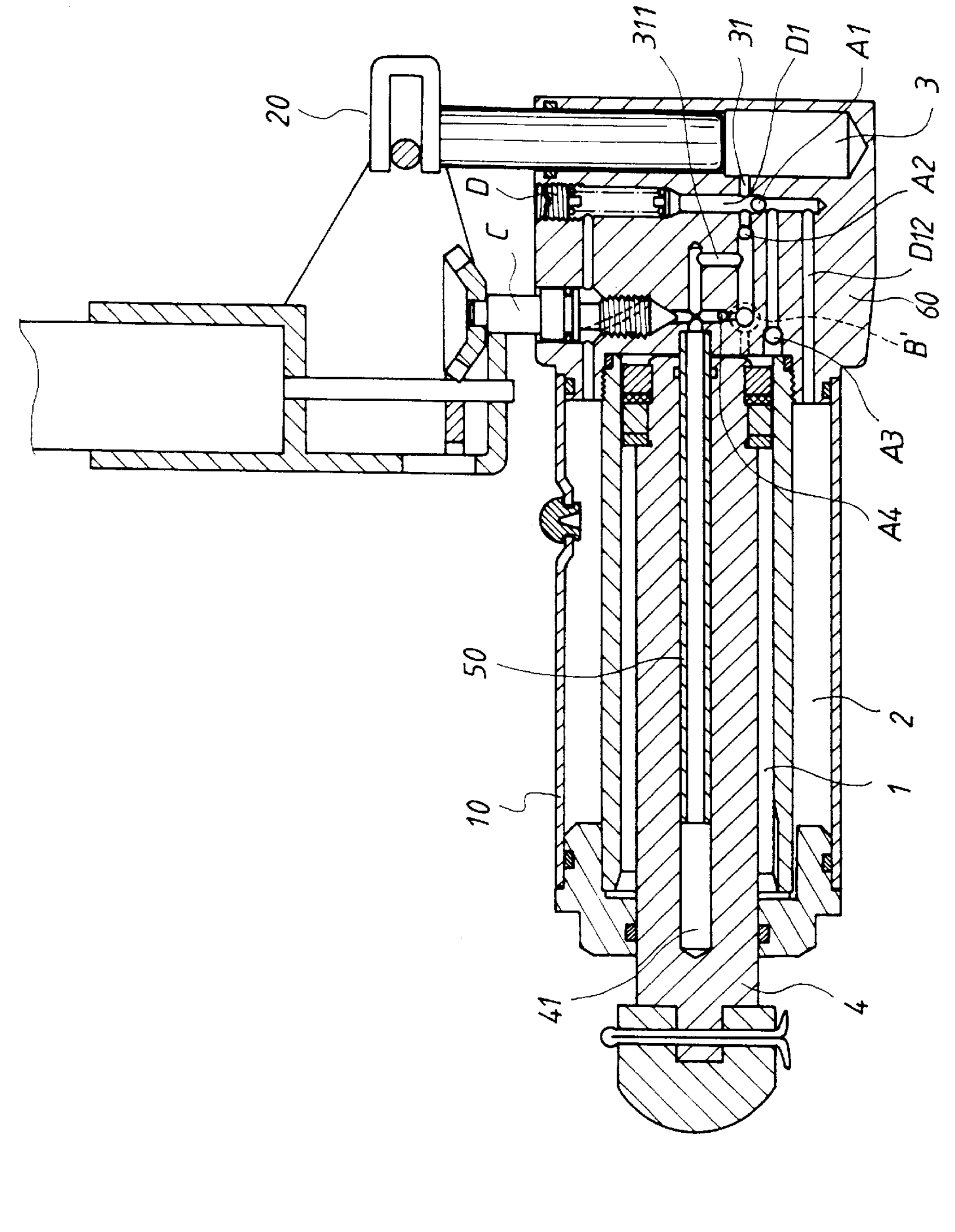
FIG. 6 is a sectional view of the sequence valve according to the present invention.
Figure 7:
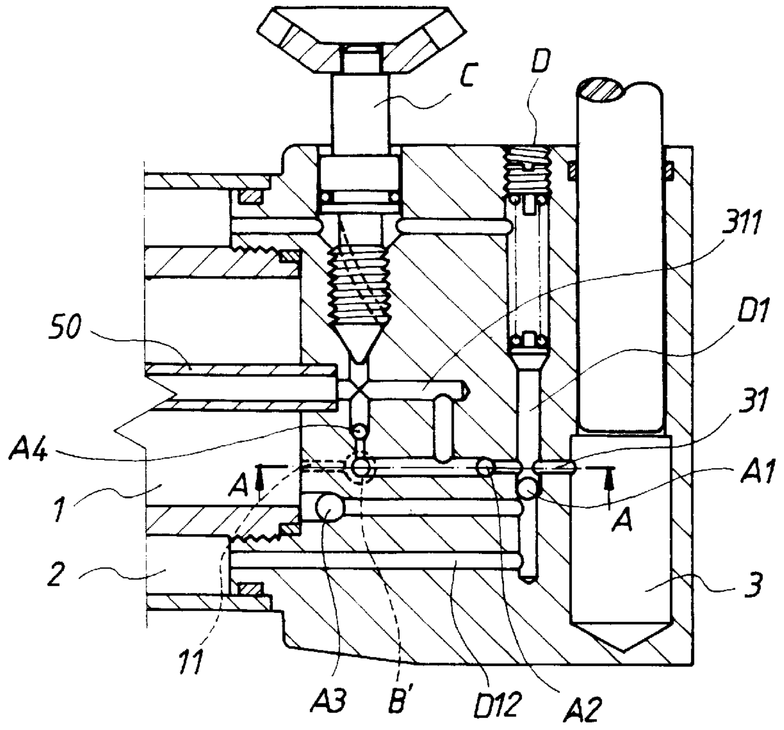
FIG. 7 is a schematic partial enlarged view of the embodiment shown in FIG. 6.
Figure 8:
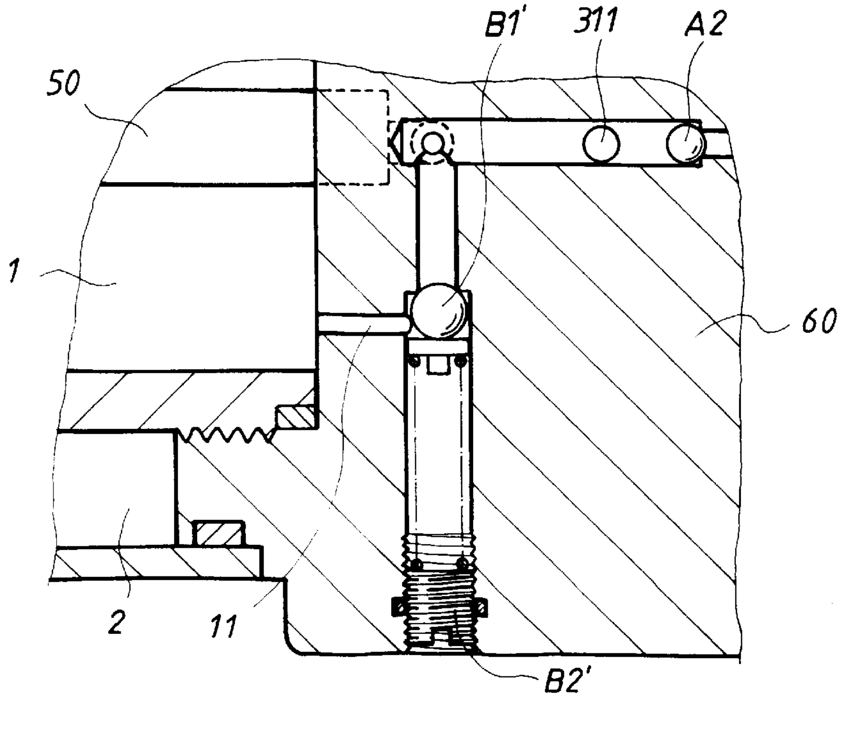
FIG. 8 is a schematic partial cross sectional view along A—A in FIG. 7.

According to aforesaid embodiment, the actuating pressure of the sequential valve B can be set in advance according to the practical requirement, and the sequential valve B can be directly arranged within the rear seat 60 of the jack for forming as a hiding type. However, similarly, the sequential valve B' can be located outsides, as the embodiment shown in FIGS. 6 and 7. The sequential valve B' can be located in a position with a 90 degrees shifting, while the check valves A2, A3 and A4 and oil channel 311 connected the sequential valve B' and the common oil channel 31 are remained unchanged. However, in this condition, a connecting oil channel 11 (as shown in FIG. 8) is required to be installed between the valve ball B1' and the inner oil reservoir 1. Thus, the adjustable nut B2' of the sequential valve B' is locked to the outer wall of the rear seat 60 of the jack. The aforesaid sequential valve B' can be located outsides for adjusting the pressure setting of the sequential valve B' conveniently. Therefore, the user may set the pressure easily to suit different requirements in actuation. As a consequence, all the modifications of the sequential valve B is within the scope and spirit of the present invention.

Although the present invention has been described with reference to the preferred embodiments,.it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An oil circuit of a jack for rising an object to a preset position rapidly comprising an oil inlet circuit, an oil return circuit, and an overload protecting circuit, and the inner oil reservoir (1), outer oil reservoir (2), pumping oil chamber (3) and piston rod (4) of a hydraulic cylinder (10), wherein in the oil inlet circuit, the outer oil reservoir (2) of the hydraulic cylinder (10) is communicated to the pumping oil chamber (3) through a check valve (A1), the pumping oil chamber (3) passes through a sequential valve (B) to be communicated to the inner oil reservoir (1) of the hydraulic cylinder (10), and the outer oil reservoir (2) is communicated to the inner oil reservoir (1) of the hydraulic cylinder (10) through a check valve (A3);

in the oil return circuit, the inner oil reservoir (1) of the hydraulic cylinder (10) is communicated to the inner oil chamber (41) of the piston rod (4) through a check valve (A4), then it further passes through a release valve (C) to be communicated to an outer oil reservoir (2); when a load is loaded and then the jack returns to the original position, the release valve (C) can be adjusted to a release position so that the oil return circuit is opened; and in the overload protecting circuit, the outer oil reservoir (2) of the hydraulic cylinder (10) passes through a safety valve (D) to be communicated to the pumping oil chamber (3); when the pressure of the hydraulic cylinder (10) is over a rated pressure, the safety valve (D) will be conducted so that the overload protecting circuit is actuated; wherein in the aforesaid hydraulic loop system, the maximum effective oil storing amount of the pumping oil chamber is large than or equal to the maximum effective oil storing amount of the inner oil chamber in the piston rod;

a common oil channel (31) is installed between the pumping oil chamber (3), the inner oil chamber (41) of the piston rod (4) and the sequential valve (B), a check valve (A2) is installed between the oil channel (31) and the sequential valve (B), an oil channel (311) is installed between the sequential valve (B) and the check valve (A2) for being connected to the inner oil chamber (41) of the piston rod (4); when in the working conditions of dump load or light load, the sequential valve (B) is closed, thus, the hydraulic oil enter into the inner oil chamber (41) of the piston rod (4) from the pumping oil chamber (3) through the check valve (A2) so that the piston rod (4) will rise rapidly to a still condition; in the still load condition, since the check valve (A2) closes the oil channel (31), the sequential valve (B) will open automatically so that the inner oil chamber (41) of the piston rod (4) is communicated to the inner oil reservoir (1); thus the inner and outer oil pressures of the oil guiding tube (50) in the piston rod (4) are equal.

2. The oil circuit of a jack for rising an object to a preset position rapidly as claimed in claim 1, wherein the sequential valve (B) is located outsides with a 90 degrees of position shift, and a connecting oil channel (11) is installed between a valve ball (B1) and the inner oil reservoir (1) so that the adjusting nut of the sequential valve (B) is locked to the outer wall of a rear seat (60) of the jack.

* * * * *